United States Patent [19]

Westgard

[11] Patent Number: 4,817,346

[45] Date of Patent: Apr. 4, 1989

[54] DEVICE FOR FEEDING PRESERVATIVE TO WOODEN POSTS

[76] Inventor: Carl T. Westgard, 2049 Crestvue Circle, Golden, Colo. 80401

[21] Appl. No.: 139,009

[22] Filed: Dec. 29, 1987

[51] Int. Cl.⁴ .......................... A01M 1/20; E04C 3/30

[52] U.S. Cl. .......................................... 52/101; 52/168

[58] Field of Search .......................... 52/101, 168, 170; 47/40.5; 248/524, 523

[56] References Cited

U.S. PATENT DOCUMENTS

| | | | |
|---|---|---|---|
| Re. 12,385 | 8/1905 | Bruley . | |
| 359,622 | 3/1887 | Murray . | |
| 372,141 | 10/1887 | Gorrill . | |
| 405,658 | 6/1889 | Campany . | |
| 574,641 | 1/1897 | Streator . | |
| 646,970 | 4/1900 | Francis . | |
| 725,820 | 4/1903 | Beazley . | |
| 822,131 | 5/1906 | Hyder . | |
| 837,820 | 12/1906 | Forsom et al. . | |
| 868,953 | 10/1907 | White . | |
| 933,291 | 9/1909 | Cogswell . | |
| 942,761 | 12/1909 | Voynow . | |
| 972,912 | 10/1910 | Prescott . | |
| 982,380 | 1/1911 | Martin . | |
| 1,001,144 | 8/1911 | Hilliard . | |
| 1,416,641 | 5/1922 | Jaeckle et al. . | |
| 1,419,108 | 6/1922 | Bitting | 52/168 |
| 1,461,046 | 7/1923 | Patterson . | |
| 1,507,103 | 9/1924 | Bagwell | 52/168 |
| 1,668,020 | 5/1928 | Marquarrdt . | |
| 1,735,722 | 11/1929 | Beard | 52/168 |
| 1,982,569 | 11/1934 | Byrd . | |
| 2,040,010 | 5/1936 | McMachon . | |
| 2,135,974 | 11/1938 | Graban | 52/168 |
| 2,196,140 | 4/1940 | Coffman | 52/168 |
| 2,724,156 | 11/1955 | Shaw . | |
| 2,938,304 | 5/1960 | Thomas | 248/524 |
| 3,335,534 | 8/1967 | Hester . | |
| 3,355,998 | 12/1967 | Roemisch . | |
| 3,615,110 | 10/1971 | Fugate . | |
| 3,628,296 | 12/1971 | Henry . | |
| 3,683,739 | 8/1972 | Garretson . | |
| 3,756,568 | 9/1973 | Mocny . | |
| 3,785,107 | 1/1974 | Garretson . | |
| 3,820,749 | 6/1974 | Leonard | 47/40.5 |
| 4,015,827 | 4/1977 | Brand . | |
| 4,033,080 | 7/1977 | Fukushima . | |
| 4,126,963 | 11/1978 | Dunbar | 248/523 |
| 4,130,965 | 12/1978 | Patton | 47/40.5 |
| 4,346,666 | 8/1982 | Iso . | |
| 4,516,365 | 5/1985 | Chapman . | |
| 4,543,764 | 10/1985 | Kozikowski . | |
| 4,598,512 | 7/1986 | Chapman . | |
| 4,610,356 | 9/1986 | Porter | 47/40.5 |
| 4,610,432 | 9/1986 | Lewis . | |
| 4,618,287 | 10/1986 | Kinnan . | |
| 4,621,950 | 11/1986 | Kinnan . | |
| 4,644,715 | 2/1987 | Burell . | |
| 4,644,722 | 2/1987 | Phillips . | |

*Primary Examiner*—John E. Murtagh
*Attorney, Agent, or Firm*—Gary M. Polumbus

[57] ABSTRACT

A device for feeding a liquid preservative to the lower end of a wooden post includes a cup-shaped container adapted to be attached to the lower end of a wooden post with the container having a compartment for receiving a quantity of liquid preservative. A wick-like member is provided in the container for transferring liquid to the lower end of the wooden post and means are also provided for recharging the container with liquid preservative from an above-ground location when the post and container are embedded in the ground.

9 Claims, 4 Drawing Sheets

DEVICE FOR FEEDING PRESERVATIVE TO WOODEN POSTS

BACKGROUND OF THE INVENTION

1. Field of the Invention

The present invention relates to systems for improving the longevity of wooden posts by preventing rot and decay thereof and more particularly to a device which is attachable to the lower end of such a wooden post to feed preservative to the post as needed.

2. Description of the Prior Art

Wooden posts, such as those made of cedar and redwood, are used extensively in outdoor locations where they are exposed to rot and decay. Such posts are typically used in fencing systems, to support signage, or in other structural environments, and in most cases the wooden posts are embedded in the ground where decay is most likely to occur.

Decay occurs as a result of fungus growth, but fungus will only grow under certain environmental conditions. Most favorable fungus growth occurs as a result of the four following variables: (1) Heat (optimum range—68° to 95° Farenheit); (2) Moisture (20% or greater); (3) Oxygen; (4) Food (wood fibers/cellulose and wood sugars).

Moisture and adequate oxygen from soils provide extremely favorable decay conditions. Contrary to popular belief, there is no such thing as "dry rot." Dry wooden posts do not rot, thus explaining the above-ground longevity of most dry wooden structures.

Decay fungus will not readily grow if one or more of the four above-listed conditions is eliminated. The first three conditions, namely heat, moisture and oxygen, cannot be effectively controlled under real conditions. However, the fourth condition, food, can be affected. The introduction of preservatives into the wood poisons the cellulose and wood sugar, thereby depriving the decay fungus of its food supply and "preserving" the wood from rot.

Preservatives can be introduced into the wood in numerous ways. Pressure and vacuum treating methods have been developed whereby entire pieces of dried structural wood are treated with a preservative in pressure vessels. In such methods higher than atmospheric pressures, artificially created partial vacuums, and/or submergence of the wood in preservative chemicals are used to increase preservative penetration during relatively short-term treatment processes. The effectiveness of the treatment is directly proportional to the residence time of the wood in the treatment process. These processes are generally expensive and typically cause a discoloration of the natural wood. Other competitive wood preserving techniques include dip treating, wrap-around, spray, and brush-on coatings of preservative. The primary limitations with these techniques is a lack of penetration of the preservative into the wood. For this reason, these techniques are not satisfactory for use with wooden posts that are to be embedded in the ground for long periods of time.

Other systems have been devised for use with wooden posts that are embedded in the ground whereby a supply of preservative is retained in a pocket surrounding the wooden posts. Examples of such systems are disclosed in U.S. Pat. No. 1,001,144 issued to J. D. Hilliard; U.S. Pat. No. 868,953, issued to T. B. White; and U.S. Pat. No. 837,820 issued to H. P. Folsom and H. Jones.

These systems are of particular interest due to the fact that they are adapted to surround a wooden post in a below-ground location and in one instance, namely the system disclosed in the Hilliard patent, means are provided for adding preservative to the system on a periodic basis.

One significant drawback with the aforenoted patented systems for preserving wooden posts is that the preservative is disposed around the cylindrical or longitudinal walls of the post and not to the end grain of the post where it is felt that the most satisfactory or adequate penetration of the preservative is obtained.

It is therefore a primary object of the present invention to provide a system for prolonging the life of wooden posts that are embedded in the ground in a manner that is more effective and efficient than has previously been known.

It is another object of the present invention to provide a system for preserving wooden posts by continuously delivering preservative to the exposed lower end of the post where it has been determined that optimal absorption of the preservative takes place.

SUMMARY OF THE INVENTION

The present invention consists of a low cost, but effective device for continuously supplying preservative in situ and selectively to the end grain of a wooden post to extend the life of that post by protecting it from fungus decay. The device includes a container which is affixable to the lower end of a wooden post and includes means for delivering a liquid preservative that is contained in the container to the lower end of the post where it can be absorbed by capillary action into the pore space upgrain within the wooden post.

The container is designed so that it can be nailed or otherwise secured in a sealed position against the lower end of a wooden post prior to placement of the wooden post into its useful position such as in a hole provided in the ground. The post can be retained in position in any known manner, such as by the use of compacted soil, concrete or the like.

The means for delivering liquid preservative to the lower end of the post may be in the form of a wick-like strip that is disposed in the container and extends downwardly into a compartment in the container which retains a supply of liquid preservative. The strip would also be disposed so as to abut the lower end of the post. In this manner, the wick-like element would draw liquid preservative from the container and expose it to the lower end of the wooden post where it would be continuously drawn into the post by capillary action in a known manner so as to poison the cellulose and wood sugar upon which the decay fungus otherwise would have thrived and caused decay in the wooden post.

The container is provided with passages through which preservative can be injected into the internal compartment of the container on an as-needed or periodic basis. The passages are operatively connected to tubing adapted to extend to an above-ground location where the preservative can be easily injected into the container when it is known or suspected that a previous supply of the preservative has been depleted by absorption into the wooden post.

Other aspects, features and details of the present invention can be more completely understood by reference to the following detailed description of a preferred embodiment, taken in conjunction with the drawings, and from the appended claims.

DESCRIPTION OF A PREFERRED EMBODIMENT

The device 10 of the present invention might be generally described as being a cup-like container adapted to be secured to the lower end of a wooden post in a manner such that a liquid preservative disposed in the container can be fed to the lower end of the post for absorption thereby. The container further includes means for filling the container from a remote location so that the supply of preservative in the container can be maintained even when the container is attached below ground to a wooden post.

Figure 1:
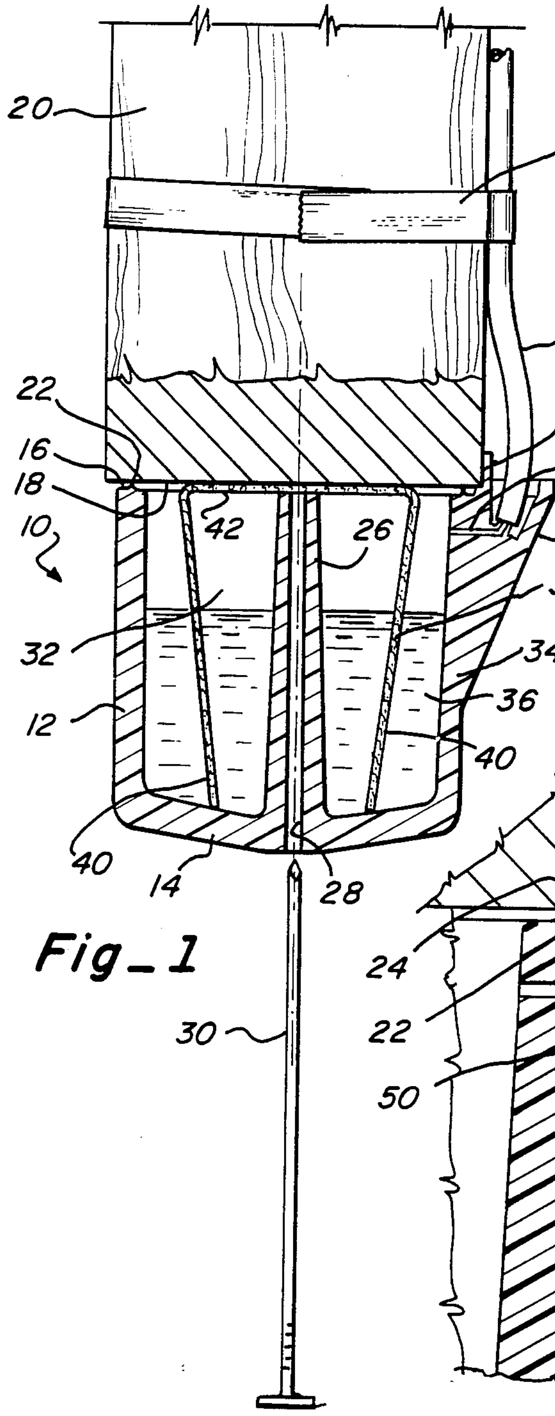
FIG. 1 is a vertical section through the device of the present invention with the device positioned adjacent the lower end of a wooden post.
Figure 2:
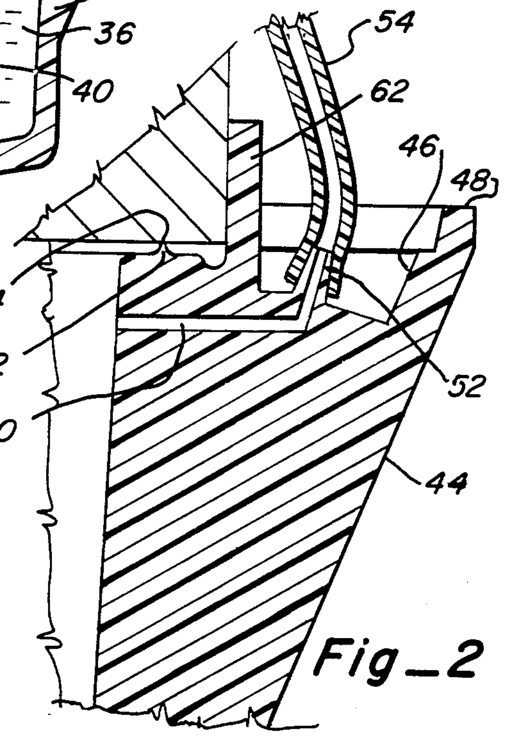
FIG. 2 is an enlarged fragmentary view of the portion of the device where tubing for injecting preservative into the device is connected thereto.
Figure 3:
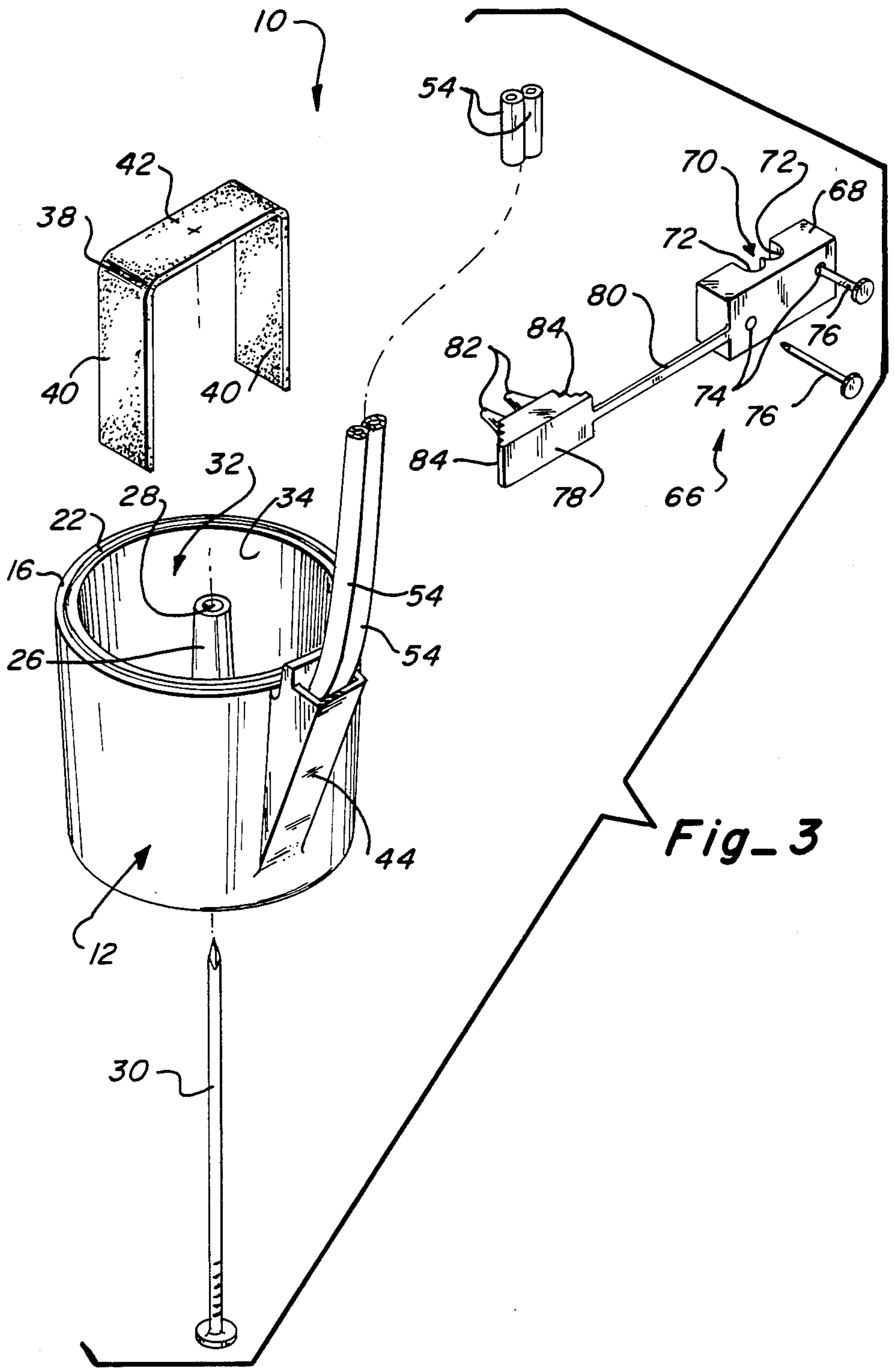
FIG. 3 is an exploded perspective view of the device of the present invention.
Figure 4:
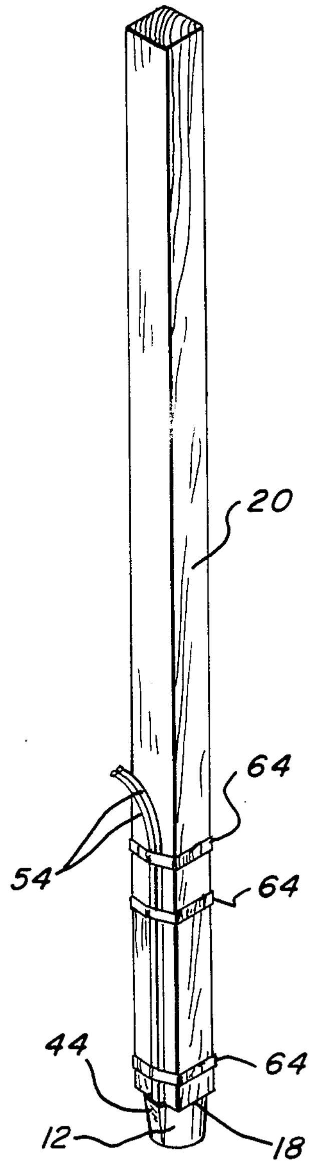
FIG. 4 is a perspective view of a wooden post having the device of the present invention attached thereto.
Figure 5:
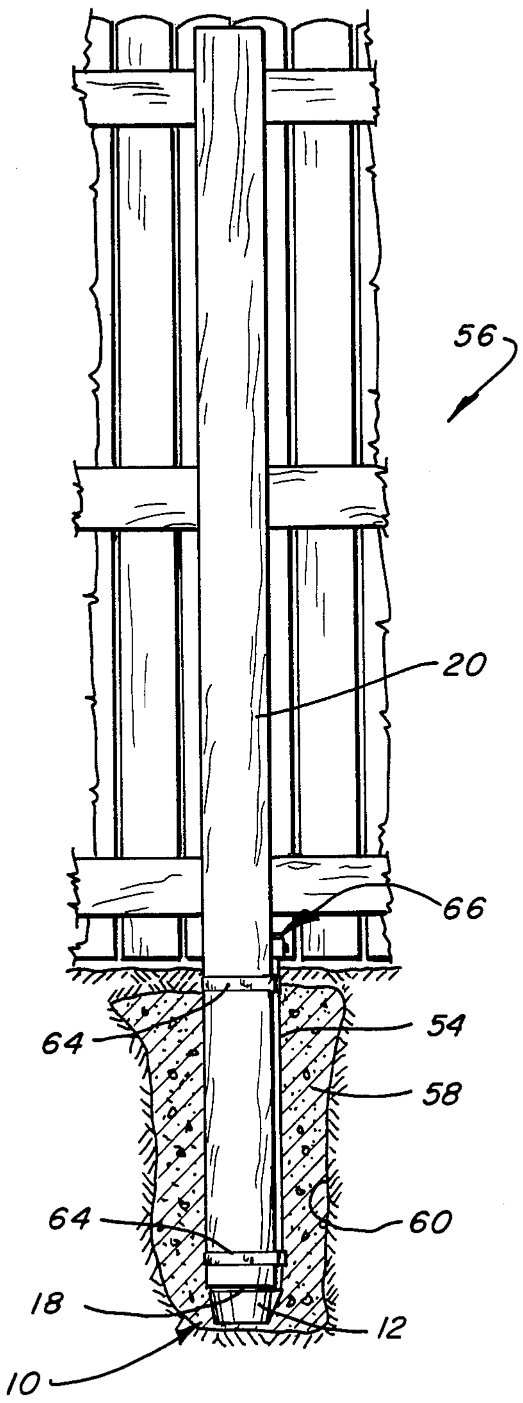
FIG. 5 is a fragmentary side elevation of the post shown in FIG. 4 being used as part of a fence with the lower end thereof embedded in the ground.

Referring first to FIGS. 1 through 3, the device 10 can be seen to include a generally cylindrical cup-like container 12, having a slightly tapered or conical bottom wall 14 and an upper circular edge 16 adapted to be abutted against the lower end 18 of a wooden post 20 along the longitudinal axis of the post. For purposes of the present disclosure the wooden post 20 will be defined as having an upper end 20U, a lower end 20L and a longitudinal side wall 20S extending between the upper end and the lower end, and wherein the lower end forms an angle with the side wall which might be any angle other than a straight angle. The upper circular edge 16 of the container 12 has a circumferential bead 22 with a pointed edge 24 passing there around so that the bead can be embedded in the lower end 18 of the wooden post to seal the container 12 against the post for reasons which will become more clear later. The container also includes a central frustoconical stem 26 having an axial passageway 28 therethrough adapted to receive a nail or other suitable fastener 30 having a length greater than the height of the container 12. The fastener 30, of course, is extended through the passageway 28 and can be driven into the lower end of the wooden post to hold the container against the wooden post in sealed relationship therewith.

A cylindrical compartment 32 is defined between the outer cylindrical wall 34 of the container 12 and the stem 26 with the compartment being adapted to receive and retain a charge or quantity of preservative 36 known to protect and extend the life of wood. An example of a preservative which has been found suitable for use in connection with the present invention is marketed under the trademark Cuprinol * by Darworth Company of Avon, Conn. When properly exposed to the lower end of the wooden post, the preservative is drawn into the post by capillary action in a known manner. The preservative poisons the cellulose and wood sugar o which the decay fungus thrives thereby preserving the wood from rot which would otherwise take place.

In order to deliver or feed the liquid preservative 36 to the bottom or lower end 18 of the wooden post, a strip 38 of cardboard or other similar absorptive material formed in a generally inverted u-shaped configuration is draped over the upper end of the stem 26 so as to be supported thereby and held in position by the nail-like fastener 30 which passes therethrough. Two legs 40 of the strip 38 project downwardly and engage the bottom conical wall 14 of the compartment 32 in which the liquid preservative is maintained so as to always be exposed to the preservative. A connector segment 42 of the strip interconnects the two legs 40 and is flat and substantially coplaner with the upper edge 16 of the container so as to abut the lower end 18 of the wooden post when the device is secured thereto. In this manner, liquid preservative is absorbed into the wick-like strip causing the preservative to fill the porous space in the absorptive strip thereby placing liquid preservative against the lower end 18 of the wooden post wherefrom it can be absorbed by capillary action into the wood in a known manner. Since the legs 40 of the wick-like strip extend to the lowest most portion of the compartment 32, the strip will continue to absorb preservative so long as preservative is contained in the compartment and will pass that preservative to the connector segment 42 of the strip in a continuous manner. Therefore, so long as liquid preservative is provided in the container, it is fed to the lower surface of the wooden post, for absorbtion thereby.

The container 12 has a thick wall portion 44 at one location on the cylindrical wall defining a laterally projecting head. A deep recess 46 is provided in a top surface 48 of the head and a pair of fill passages 50 connect the recess 46 to the compartment 32 in the container. At the locations where the passages 50 open into the recess 46, rigid frust conical heads 52 are provided to which a pair of flexible and resilient tubes 54 can be connected in fluid communication with the passages. The tubes 54 are preferably made of rubber, plastic or the like and are preferably several feet in length so as to be extendible above-ground level when the device 10 is secured to the lower end of a wooden post that has been embedded in the ground.

The tubes 54 are provided for the purpose of delivering liquid preservative 36 to the internal compartment 32 of the container 12 as such preservative is required. The tubes are established so that preservative can be injected through one tube and displaced air removed from the compartment 32 through the other tube which is necessary due to the fact that the container is sealed against the lower end 18 of the wooden post by the circumferential bead 22 on the upper edge of the container.

With particular reference to FIGS. 1 and 5 through 8, the device 10 can be seen attached to the lower end 18 of a wooden support post illustrated as being used in a fencing system 56 with the lower portion of the support post embedded in concrete 58 within a hole 60 in the ground. Prior to placing the post in such a concrete-lined hole, however, the device 10 of the present invention is attached to the lower end of the post as by driving the nail-like fastener 30 through the passage in the stem 26 and into the lower end of the wooden post. An upstanding guide 62 on the enlarged head 44 engages the side wall of the wooden post so that the recess 46 for receiving the recharging tubes 54 will always be disposed adjacent the side of the post. Obviously before the device is secured to the wooden post, the wick-like strip 38 is draped over the upper end of the stem 26 so that the nail-like fastener will pass therethrough to hold the strip in place within the container 12. With the container attached to the lower end of the post, the recharging tubes 54 are affixed to the frustoconical heads 52 in the recess and the tubes are extended up a side surface of the post and retained in place in any suitable manner as with adhesive strips 64 of the type illustrated in FIG. 1.

Figure 8:
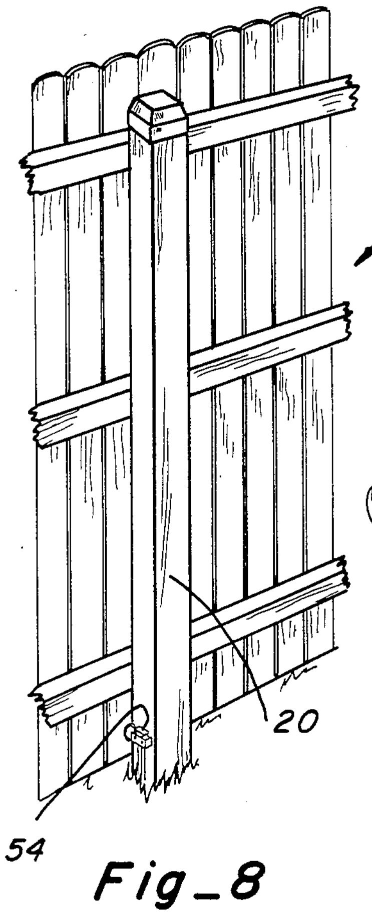
FIG. 8 is a perspective view of a fence post incorporating the device of the present invention and being used in a fencing system to illustrate the non-offensive aesthetics of the device.
Figure 6:
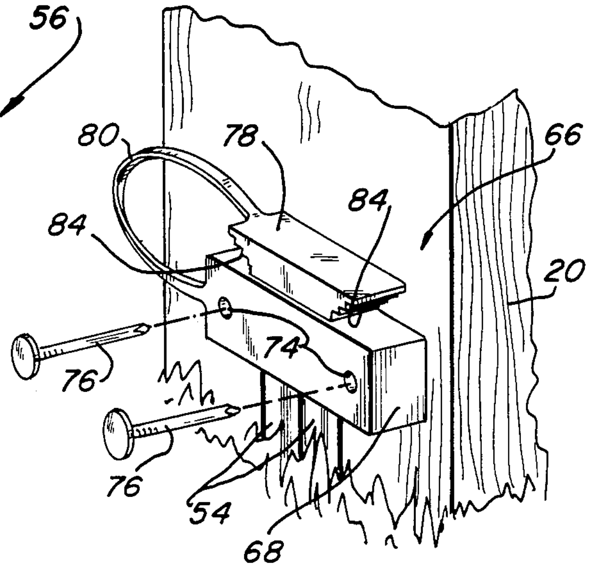
FIG. 6 is an enlarged fragmentary perspective view of a wooden post having the device of the present invention attached thereto illustrating the upper end of the tubes through which preservative is added to the device and illustrating a cap in a closed condition for sealing the upper ends of the tubes.

The post can then be positioned in the hole provided in the ground and concrete or dirt packed therearound to hold the post in its desired vertical orientation until the concrete or dirt sets up to establish a solid foundation for the post. The upper end of the tubing 54 can then be cut at a desired height several inches above ground level and a closure cap 66 as best seen in FIGS. 6 through 8 secured to the post to hold the upper ends of the dual tubing to the wooden post.

The closure cap 66 is comprised of a block element 68 having a groove 70 with two arcuate segments 72 therein adapted to matingly receive the two tubes 54. The block element 68 is provided with two openings 74 therethrough for receiving nail-like fasteners 76 which not only hold the closure cap on the wooden post but also secure the upper ends of the tubing in place. The closure cap further includes a seal member 78 which is connected to the block element by an integral but flexible arm 80 with the seal member 78 having a pair of generally frustoconical beads 82 provided on one surface thereof which are adapted to be removably inserted into the open upper ends of the two tubes 54. Serrated ends 84 of the seal member are provided for convenient finger manipulation of the seal member so that it can be easily removed from the tubular members 54 or inserted therein as desired.

Figure 7:
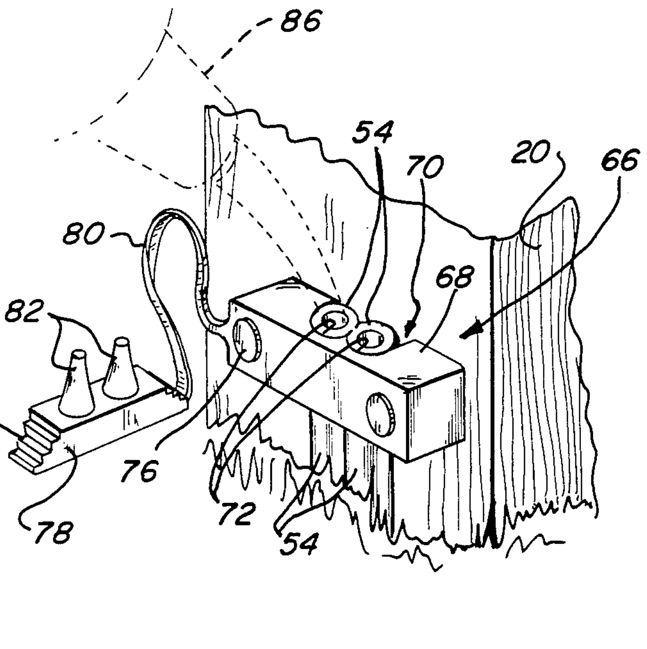
FIG. 7 is a fragmentary perspective view similar to FIG. 6 showing the cap in an open position and with a bottle of preservative shown in dotted lines positioned to inject preservative into the device.

As illustrated in FIG. 7, when it is desired to replenish or charge the container with liquid preservative 36, a bottle 86 containing such preservative, as illustrated in dotted lines in FIG. 7, is inserted into one of the tubes 54 so that the liquid preservative will flow through that tube and into the internal compartment 32 of the container 12 while air escapes through the opposite tube.

Although the present invention has been described with a certain degree of particularity, it is understood that the present disclosure has been made by way of example, and changes in detail or structure may be made without departing from the spirit of the invention, as defined in the appended claims.

I claim:

1. A device for feeding a preservative to a wooden post having an upper end, a lower end and a side wall extending between the upper and lower ends, and wherein the lower end forms an angle other than a straight angle with the side wall, comprising in combination:

a. A container for holding a charge of liquid preservative, said container having a compartment in which the preservative is confined, b. Attachment means for securing the container to the wooden post such that the compartment is disposed beneath the lower end of the post when the post is substantially vertically oriented whereby the preservative can be drawn into said lower end, and c. Feed means on said container for delivering the preservative to the lower end of the post, said feed means being an absorptive wick-like element positioned in said compartment so as to abut the lower end of said post when the device is attached to the post.

2. The device of claim 1 further including recharging means for permitting preservative to be delivered to the container when the container is attached to the post.

3. The device of claim 2 wherein said recharging means includes at least one passageway establishing communication between the interior and exterior of the container.

4. The device of claim 3 wherein there are two passageways with one passageway permitting the injection of preservative into the container and the other serving as a vent for air displaced from the container.

5. The device of claim 2 wherein said container has a central stem with a passageway therethrough whereby a fastener can be extended through the passageway in the stem and embedded in the post to secure the container to the post.

6. The device of claim 5 wherein said device has an upper edge adapted to abut the lower end of the post when attached to the post.

7. The device of claim 6 further including seal means on the upper edge of the container.

8. The device of claim 7 wherein said seal means comprises a raised rib adapted to be embedded in the lower end of the post when the container is attached to the post.

9. A device for feeding preservative to a wooden post having an upper end, a lower end and a side wall extending between the upper and the lower end, and wherein the lower end forms an angle other than a straight angle with the side wall, comprising in combination:

a. a substantially cylindrical container having an open upper end and a compartment defined therein for receiving a charge of liquid preservative for the wood, said container having a hollow stem therethrough adapted to receive an elongated fastener adapted to secure the container to the lower end of the post, an upper edge having a raised head adapted to be embedded in the lower end of the post when the container is attached thereto to seal the container against the lower end of the post, and a pair of passageways establishing communication between the interior and the exterior of the container, b. an absorptive wick-like element projecting into said compartment and having a portion thereof substantially co-planar with the upper edge of the container so as to abut the lower end of the post when the container is attached thereto, and c. tubular means operatively connected in fluid communication with said pair of passageways to establish means by which liquid preservative can be injected into the compartment.

* * * * *